US011636381B1

(12) United States Patent
Joseph et al.

(10) Patent No.: US 11,636,381 B1
(45) Date of Patent: Apr. 25, 2023

(54) EVENT STREAMS IN A MACHINE LEARNING SYSTEM FOR DEMAND FORECASTING

(71) Applicant: Legion Technologies, Inc., Redwood City, CA (US)

(72) Inventors: Thomas Joseph, Atherton, CA (US); Yahya Sowti Khiabani, Fremont, CA (US); Sanish Mondkar, San Francisco, CA (US); Gopal Sundaram, Saratoga, CA (US)

(73) Assignee: LEGION TECHNOLOGIES, INC., Redwood City, CA (US)

( * ) Notice: Subject to any disclaimer, the term of this patent is extended or adjusted under 35 U.S.C. 154(b) by 534 days.

(21) Appl. No.: 16/520,638

(22) Filed: Jul. 24, 2019

(51) Int. Cl.
| | |
|---|---|
| *G06Q 10/06* | (2012.01) |
| *G06N 20/00* | (2019.01) |
| *G06N 5/04* | (2023.01) |
| *G06F 16/29* | (2019.01) |
| *G06Q 10/0637* | (2023.01) |
| *G06Q 30/0204* | (2023.01) |
| *G06N 5/02* | (2023.01) |

(52) U.S. Cl.
CPC ............ *G06N 20/00* (2019.01); *G06F 16/29* (2019.01); *G06N 5/02* (2013.01); *G06N 5/04* (2013.01); *G06Q 10/06375* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 9,525,728 B2 * | 12/2016 | Sethi | .................... H04L 67/1012 |
| 2016/0283953 A1 | 9/2016 | Ettl et al. | |
| 2017/0278053 A1 * | 9/2017 | High | .................... G06Q 10/087 |
| 2020/0111109 A1 * | 4/2020 | Lei | ......................... G06N 20/10 |
| 2020/0184494 A1 | 6/2020 | Joseph et al. | |

FOREIGN PATENT DOCUMENTS

WO  WO-2019181009 A1 *  9/2019  ............. G06Q 10/04

OTHER PUBLICATIONS

Makridakis et al., "Statistical and Machine Learning forecasting methods: Concerns and ways forward," PLoS One, Mar. 27, 2018, 13(3):e0194889, 26 pages.

* cited by examiner

*Primary Examiner* — Alan Torrico-Lopez
(74) *Attorney, Agent, or Firm* — Fish & Richardson P.C.

(57) ABSTRACT

A machine learning system for forecasting demand implements an improved process using event streams for predicting the impact that events in the geographic area surrounding an establishment have on demand forecasts for the establishment. A range of distances from the establishment can be determined and divided up into different distances. Event streams can be generated from the events by grouping the events into combinations of event attributes, such as event category and the distance of the event from the establishment. The event streams can be provided as inputs along with demand data for computing demand forecasts that account for increased or decreased traffic patterns in the geographic area surrounding the event. The event streams can be filtered based on the magnitude of the impact the events have on the demand for the products and/or services of the establishment before, during and after the event takes place.

15 Claims, 9 Drawing Sheets

EXAMPLE COMBINATIONS TABLES FOR EVENT CLUSTERING

| Event Category | Distance Range | Importance Value |
|---|---|---|
| Large Sporting Event | Range 1 | 1 |
| | Range 2 | 1 |
| | Range 3 | 1 |
| | Range 1 | 2 |
| | Range 2 | 2 |
| | Range 3 | 2 |
| | Range 1 | 3 |
| | Range 2 | 3 |
| | Range 3 | 3 |
| | Range 1 | 4 |
| | Range 2 | 4 |
| | Range 3 | 4 |
| | Range 1 | 5 |
| | Range 2 | 5 |
| | Range 3 | 5 |

| Event Category | Distance Range | Importance Value |
|---|---|---|
| Local Community Event | Range 1 | 1 |
| | Range 2 | 1 |
| | Range 3 | 1 |
| | Range 1 | 2 |
| | Range 2 | 2 |
| | Range 3 | 2 |
| | Range 1 | 3 |
| | Range 2 | 3 |
| | Range 3 | 3 |
| | Range 1 | 4 |
| | Range 2 | 4 |
| | Range 3 | 4 |
| | Range 1 | 5 |
| | Range 2 | 5 |
| | Range 3 | 5 |

FIG. 3

EXAMPLE CLUSTERED EVENT STREAM 400

| Event Name | Event Category | Date | Distance | Importance Value |
|---|---|---|---|---|
| San Francisco Giants v. Colorado Rockies | Large Sporting Event | 05/07/2019 | Range 1 | 9 |
| San Francisco Giants v. New York Mets | Large Sporting Event | 05/8/2019 | Range 1 | 9 |
| San Francisco Giants v. New York Yankees | Large Sporting Event | 05/9/2019 | Range 1 | 9 |
| San Francisco Giants v. Florida Marlins | Large Sporting Event | 05/17/2019 | Range 1 | 9 |
| San Francisco Giants v. Atlanta Braves | Large Sporting Event | 05/18/2019 | Range 1 | 9 |
| San Francisco Giants v. New York Mets | Large Sporting Event | 05/19/2019 | Range 1 | 9 |

FIG. 4

EXAMPLE CLUSTERED EVENT STREAM 500

| Event Name | Event Category | Date | Distance | Importance Value |
|---|---|---|---|---|
| Weekly Farmer's Market | Local Community Event | 06/15/2019 | Range 2 | 3 |
| Weekly Farmer's Market | Local Community Event | 06/22/2019 | Range 2 | 3 |
| Weekly Farmer's Market | Local Community Event | 06/29/2019 | Range 2 | 3 |
| Local Street Fair | Local Community Event | 07/04/2019 | Range 2 | 3 |
| Weekly Farmer's Market | Local Community Event | 07/06/2019 | Range 2 | 3 |
| Music in the Park | Local Community Event | 07/07/2019 | Range 2 | 3 |

EVENT STREAMS IN A MACHINE LEARNING SYSTEM FOR DEMAND FORECASTING

CROSS REFERENCE TO RELATED PATENT APPLICATIONS

This patent application is related to co-pending non-provisional U.S. patent application Ser. No. 16/210,865, entitled "Demand Forecasting Using Automatic Machine-Learning Model Selection," filed on Dec. 5, 2018, the disclosure of which is incorporate by reference herein.

BACKGROUND

Technical Field

Embodiments described in this disclosure relate generally to a system for demand forecasting using machine learning techniques, and in particular, to a machine learning system for demand forecasting with an improved process for predicting impact of events on demand forecasts.

Brief Description of the Related Art

Workforce management is becoming increasingly important in the new Gig-economy with constantly evolving technologies, labor force and associated changes in labor laws. Accurate demand forecasting is a critical part of better workforce management in that it allows organizations to predict how busy they will be at on future occasions. Organizations are therefore increasingly investing in strategies for improving their demand forecasting capabilities. By accurately forecasting demand for their products and/or services, organizations can improve their workforce management processes. Accurate demand forecasts can assist organizations in avoiding understaffing peak periods or overstaffing slow ones.

It is therefore becoming important for organizations to obtain accurate demand forecasts to anticipate staffing requirements and identify the most qualified personnel, at the right time, and in the right location. But forecasting accuracy is inherently limited by the quality and/or quantity of data that is available for the analysis. Thus, various methods are being developed to locate and collect additional types of data that may be useful to incorporate into demand forecast modeling and analysis for improved demand predictions.

SUMMARY

At least certain aspects described in this disclosure are directed to systems, methods and computer readable media for implementing a machine learning system that uses event streams for predicting the impact of events on demand forecasts for an organization or establishment at a specific geographic location. In one embodiment the events may comprise local events within the vicinity of an organization or establishment that will have a relevant impact on traffic patterns in the surrounding geographic area, and thus may impact the demand for the products and/or services of the establishment to some degree. This information may be referred to herein as "events data" and may be received from a myriad of different sources, including online sources, for events in the surrounding area. The events data may include "event attributes" and may be stored in one or more events databases for a plurality of different events that are to take place within a distance from the geolocation of the organization or establishment.

A range of distances from the establishment may be determined and divided up into different distances. Event streams can be generated from the events by grouping the events into combinations of event attributes, such as event category and the distance of the event from the establishment. The event streams can be provided as inputs along with demand data for computing demand forecasts that account for increased or decreased traffic patterns in the geographic area surrounding the event. The event streams can be filtered based on the magnitude of the impact the events have on the demand for the products and/or services of the establishment before, during and after the event takes place.

The aspects, features, and advantages of the disclosed embodiments will become apparent to those of ordinary skill in the art from the following description of specific embodiments in conjunction with the accompanying figures.

DETAILED DESCRIPTION

Throughout this description numerous details are set forth in order to provide a thorough understanding of the various embodiments of this disclosure, which are provided as illustrative examples so as to enable those of skill in the art to practice the embodiments. It will be apparent to those skilled in the art that the techniques described in this disclosure may be practiced without some of these specific details, or in other instances well-known structures and devices may be shown in block diagram form to avoid obscuring the principles and techniques described in this disclosure. The figures and examples provided in this disclosure are not intended to limit its scope to any single embodiment, as other embodiments are possible by way of interchange of some or all of the described or illustrated elements. Moreover, applicants do not intend for any term in the specification or claims to be ascribed an uncommon or special meaning unless such meaning is explicitly set forth herein.

Generally, when a system is forecasting demand for some product or service, it is attempting to predict the occurrence of something on a future date based on what the system has learned from occurrences at points in time on previous occasions. The data representing the demand for a particular product or service on one or more previous occasions is referred to as historical demand data (or "demand data" or "historical demand data"). It consists of a value, typically a number or percentage, representing what the demand for a particular product or service was on the previous occasions. For instance, the demand forecast may comprise the number of coffee cups sold at a particular coffee house from 9 am to 10 am on a normal weekday. This raw demand data can be used to forecast what the demand will be on a future occasion.

One significant driver of demand for products and/or services of a particular "brick and mortar" organization or establishment may be traffic patterns in the surrounding vicinity at different times of the day and in response to the occurrence of different events. The events may include large concerts or conferences, crowds traveling to or from work, nearby local events, local theater performances, etc. Unfortunately conventional demand forecasting systems have heretofore failed to take this information into consideration in demand forecasting models resulting in potentially missed opportunities for improving the accuracy of demand forecasts. To the extend events in the local vicinity of the organization or establishment have an impact on the demand for a product or service before, during and/or after the event takes place, this data may be used in combination with the historical demand data for the organization to improve the accuracy of demand forecasts on future occasions.

Demand forecasting systems can also be improved using machine learning techniques. At a general level, machine learning involves algorithms and statistical models that computer systems use to progressively improve performance of tasks over time without having to be programmed by a person to do so. Machine learning systems thus improve as they "learn" from collecting, storing and indexing additional input data and evaluating corresponding output data to identify patterns. Machine learning models can be developed based on processing "training data" using one or more machine learning algorithms. The training data may comprise a sufficient subset of a particular dataset in order to train one or more machine learning models in the system. The "trained" machine learning model(s) can thereafter be used to make predictions or decisions about future events or data without having to be explicitly programmed to perform such tasks. Machine learning techniques can be utilized with demand forecasting systems to improve the analysis over time as the system obtains more demand data. Co-pending U.S. patent application Ser. No. 16/210,865, incorporated by reference herein above, discloses various machine learning techniques for demand forecasting operations.

At least certain aspects of this disclosure are directed to systems, methods and computer readable media for implementing a machine learning demand forecasting system that uses event streams for predicting the impact of events on demand forecasts for an organization or establishment located at a specific geolocation. In one embodiment the events may comprise local events or events within a vicinity of the organization or establishment that will have a relevant impact on traffic patterns in the surrounding geographic area, and thus impact the demand for the products and/or services of the organization to some degree.

In order for accurate predictions, however, the demand forecast cannot take as inputs all of the event attributes in all of the categories of all of the events in the vicinity of the establishment because these individual events are too vastly diverse and have little or no logical grouping from which to extract any useful data or useful trends in the data. If events that are too diverse are grouped together (e.g., in size, time, location, category, importance, etc.), then the system cannot really learn anything from them. And such a process is very computationally inefficient. As an example, one event consisting of a person playing guitar in a local coffee shop in comparison with a large music concert within the same vicinity do not have much in common from which the occurrence of one of event would give any useful insight into the demand patterns that would occur during the occurrence of the other event. How a little league game in the vicinity of an establishment impacts the demand for its products or services does not really provide any useful information about how a Giants' game would impact the demand. On the other hand, if there are too few events, not much can be learned from those events either.

In at least certain aspects the events in the surrounding geographic area of an organization or establishment may be clustered into event streams. Similar events (e.g., those having the same event attributes such as the same event category and the same distance from the geolocation of the organization) can be grouped together into a plurality of "event streams" that have a similar impact on the demand for a product or service of the establishment in order to learn patterns and make more accurate predictions of the demand on future occasions. This may be helpful for organizations to assist with their workforce management processes.

The embodiments described in this disclosure include systems and methods for predicting what impact events in the surrounding geographic area will have on demand forecasts for a particular organization or establishment by grouping similar events into event streams based on event attributes in the events data. The events that have been clustered together can be used to identify patterns and groups of events that have a similar impact on demand forecasts for the organization or establishment (e.g., "brick and mortar" purveyor of products or services).

EXAMPLE SYSTEMS

Provided below is a description of an example machine learning system for demand forecasting implementing an improved process for predicting the impact of events on demand forecasting within a geographic area in accordance with the teachings of this disclosure. Although certain elements may be depicted as separate components, in some instances one or more of the components may be combined into a single device or system. Likewise, although certain functionality may be described as being performed by a single element or component within a system, the functionality may in some instances be performed by multiple components or elements working together in a functionally coordinated manner. In addition, hardwired circuitry may be used independently or in combination with software instructions to implement these techniques.

Further, the features and aspects described herein are not limited to any specific combination of hardware or software. For example, the described functionality may be performed by custom hardware components containing hardwired logic for performing operations, by general-purpose computer hardware containing a memory having stored thereon programmed instructions for performing operations, or by any combination of computer hardware and programmed components. The features and aspects may also be practiced in distributed computing environments, such as in a private or public cloud-based network where operations may be performed by remote processing devices or systems that are in communication via one or more wired or wireless networks.

In one embodiment the events may comprise local events within the vicinity of the organization or establishment that will have an appreciable impact on traffic patterns in the surrounding geographic area, and thus have an attendant impact on the demand for the products and/or services provided by the establishment. Events can be clustered in ways such that each event will have the same (or similar) impact on the demand forecasts. The disclosed techniques relate to grouping events based on patterns in such a way that the machine learning system for demand forecasting can learn something useful about the grouped events. Events in the same category and in the same distance range from the establishment can be grouped together in meaningful ways to predict their impact on the demand. The system can further be adapted to test each of the groupings to determine which ones impact the demand forecasts and by how much.

Figure 1A:
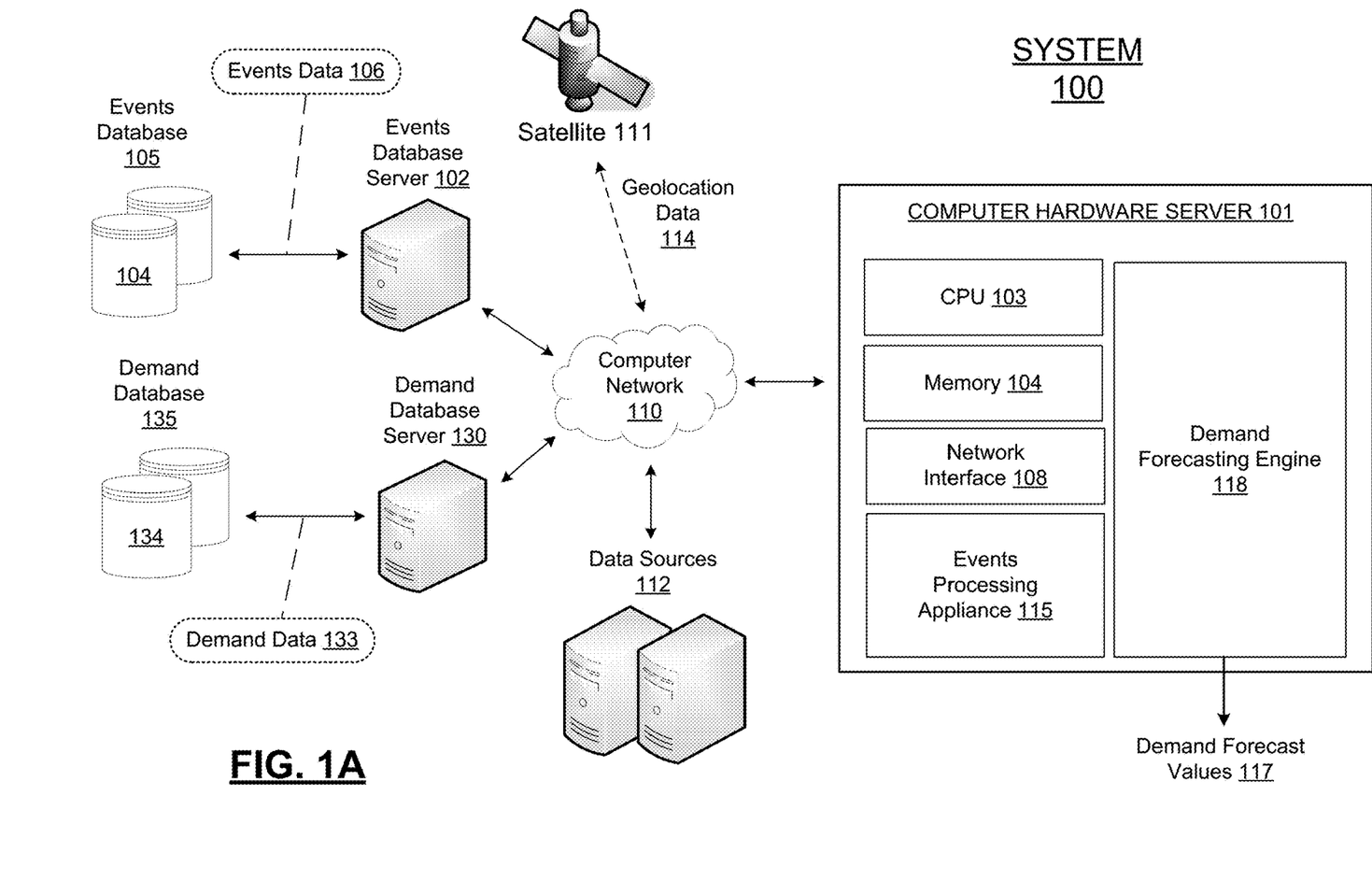
FIG. 1A depicts a conceptual block diagram of an example embodiment of a machine learning system for demand forecasting that implements an improved process for predicting the impact of events on demand forecasts for an organization using event streams in accordance with the teachings of this disclosure.

FIG. 1A depicts a conceptual system diagram of an example embodiment of a machine learning system 100 for demand forecasting in accordance with the teachings of this disclosure. The machine learning system 100 may be realized using a computer hardware server 101 which comprises a processor (CPU 103), system memory 104, and a network interface 108 for communicating via one or more computer networks 110. The machine learning system 100 for demand forecasting may access one or more database systems. In the illustrated embodiment, computer hardware server 101 communicates with an events database 105 comprising one or more data storage devices 104 via an events database server 102 and with a demand database 134 comprising one or more data storage devices 134 via a demand database server 130. The events database 105 may be configured for storing events data 106 received from one or more data sources 112 via computer network 110. In one embodiment the events data may comprise time-based data adapted to be stored in a time series database.

New or updated demand data may be received by the demand database server 130 from one or multiple different data sources 112 via one or more computer networks or interconnections 110. Computer network 110 can be implemented in any wired or wireless network or infrastructure, including in one or more private and/or public cloud-based networks. The data sources 112 for the demand data may include point of sale ("POS") systems that provide online payment processing and transaction data. In such embodiments, system 100 can be configured to integrate with various online POS systems (e.g., mobile payment processors such as Square, Inc. or Revel Systems, Inc.) to obtain demand data 133 therefrom for demand forecasting. System 100 can receive and store the demand data 133 from data sources 112 into demand database 135. Each set of demand data 133 may contain information relating to different locations and/or categories of items for which demand forecasting is sought. Drivers of demand may include past sales, store traffic, seasonality, weather, nearby events, etc. For example, a certain bicycle shop may have three locations and the system can develop a machine learning model for each different type of product and/or service available at each of the different locations. System 100 can be adapted to compute demand forecasts for one or more future occasions for different items, products or services, etc., based on the stored demand data. The computed demand forecasts can then be used for ascertaining the number and qualifications of personnel needed for each task category to be accomplished at each location for better workforce management. The system can also be configured to constantly process demand data 133 received over the computer network 110 in order to forecast demand based on a constantly evolving dataset. For example, the demand predictions can be computed every 30 minutes and can be computed for different locations and different products or services.

In one aspect the machine learning system for demand forecasting 100 may be configured to receive geolocation data 114 over cloud network 110 identifying the geolocation of the organization or establishment. System 100 may receive event attributes in the events data 106 from the events database 105 for a plurality of different events that are (or will be) located within a certain distance from the geolocation of the organization or establishment. The events database 105 may comprise a time series database and the events data 106 may be collected from data sources 112 and stored in the events database 105 as time-based events data and related events attributes. The event attributes may include the event name, event category, date and time of the event, event location, venue, size of the event, and/or importance of the event as extracted from an importance value associated with the event indicating its relative importance as discussed further herein. Once the events data 106 is received by the computer hardware server 101, the geolocation of the establishment can be extracted from the geolocation data 114. The geolocation data 114 may be received from one or more satellites 111 via cloud network 110.

Events data can be any kind of time-based data. The events database server 102 can be configured to receive and store events data 106 from a plurality of different data sources 112. For instance, online sources of events information can be monitored by system 100 for upcoming events. This may include social media and other online channels. For example, events data may include information relating to large or small sporting events, conferences, concerts, local events, train schedules, rush hour, lunchtime, concerts, local farmer's markets and/or a vast array of other occurrences. Events data 106 can be harvested from the multiple different sources 112 via the computer network 110 and accumulated over time in computer hardware storage to be used for developing and analyzing forecasting models to achieve a better understanding of the impact the events have on the demand for products and/or services of the organization or establishment.

As shown, computer hardware server 101 further includes an events processing appliance 115, and a demand forecasting engine 118. The event processing appliance 115 may be configured to receive the events data 106 from the computer network 110 via network interface 108. For purposes of this disclosure the term "appliance" refers to a combination of specially designed software application(s) and operating system configured to provide a particular computing resource. The hardware and software may be provided as an integrated or cloud-based solution for a particular application.

The machine learning system for demand forecasting 100 may further be configured to receive as input a specified distance which is the farthest distance (or outer bounds) from the establishment in which the demand calculations are to be conducted. The input specifying the farthest distance from the geolocation of the establishment in which to perform such calculations may be received from user input or may be computed independently and/or automatically by the machine learning system 100 based on the historical demand for the products or services at issue. System 100 may be configured to divide up the farthest distance (user-specified or system-computed) from the geolocation of the organization into a set of distances. The system can then generate a range of distances based on these different distances.

Figure 2:
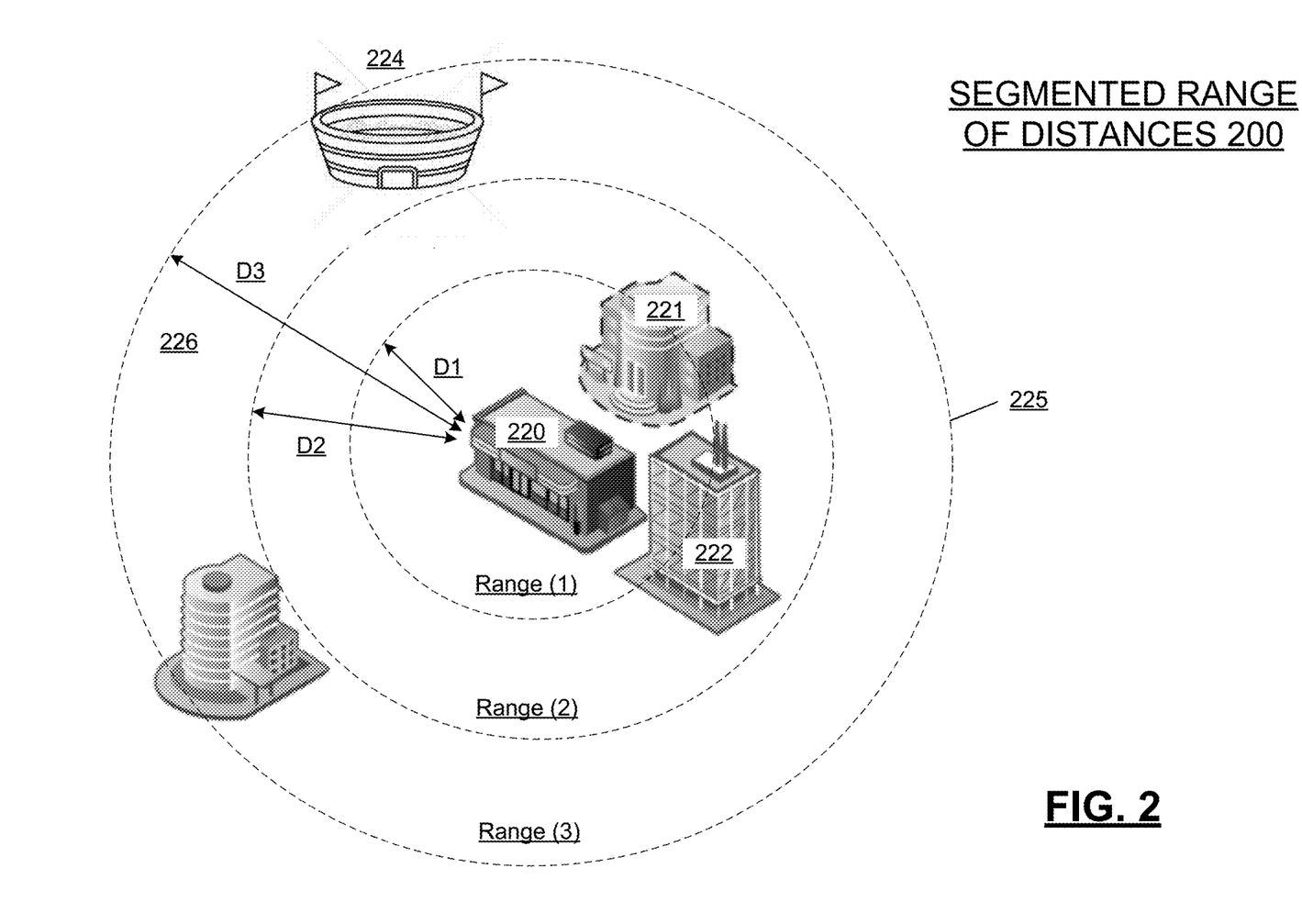
FIG. 2 depicts a conceptual diagram of a segmented range of distances for use in accordance with the techniques described in this disclosure.

FIG. 2 depicts a conceptual diagram of an example of a segmented range of distances according to the techniques described in this disclosure. In FIG. 2 the segmented range of distances 200 from the establishment in storefront 220 to the farthest distance 225 includes distances D1, D2 and D3. Events are time-based and may impact the demand for products and/or services of the establishment in storefront 220 depending on where events are located within the segmented range of distances 200 and on what time period the event is to be conducted. For buildings 221 and 222, for example, at rush hour when employees are coming to work in those buildings the system 100 may be adapted to define two distinct events relating to the increased in traffic in Range (1) for buildings 221 and 222. There may be increased demand for products or services provided by the establishment in storefront 220 during those times based on the increase in traffic to buildings 221 and 22. System 100 can be configured to harvest data for the rush hours for these nearby buildings and to use that data as an additional input to improve demand forecasting for products or services provided by the establishment in storefront 220.

System 100 can be adapted to take into account the relative distances of the events from the establishment 220 for the appropriate analysis according to the teachings of this disclosure. Because building 226 is located farther away from storefront 220 in Range (3), its rush hour traffic may not have any significant impact on the demand for products or services provided at storefront 220. In this manner system 100 can more accurately forecast demand for products or services provided at the storefront 220 for different time periods.

Further, the relative size of the events is an event attribute that is considered by system 100. There could be increased traffic during times when there is an event at the arena 224. Arena 224 is in the same Range (3) as building 226, but the events taking place at arena 224 may cause traffic patterns that are more substantial than the increased traffic at rush hour for building 226 during the time periods associated with those events. System 100 is thus configured to use the size of the events as an event attribute in the demand forecasting analysis.

Referring back to FIG. 1A, the events processing appliance 115 may include a process for normalizing the event categories used for the demand forecasting analysis by associating the plurality of events with one of a plurality of predefined event categories. Data sources 112 may provide their own event categories in the events data and these categories may need to be normalized for the demand forecasting analysis. One reason for this is because each of the data sources 112 may have its own notion of what a particular category should be, and this may need to be normalized to a set of predefined categories adapted for processing using the techniques described in this disclosure. In one embodiment, the event categories may be normalized instead of using event categories that may have been provided in the event attributes of the events data received from the data sources 112.

Figure 1B:
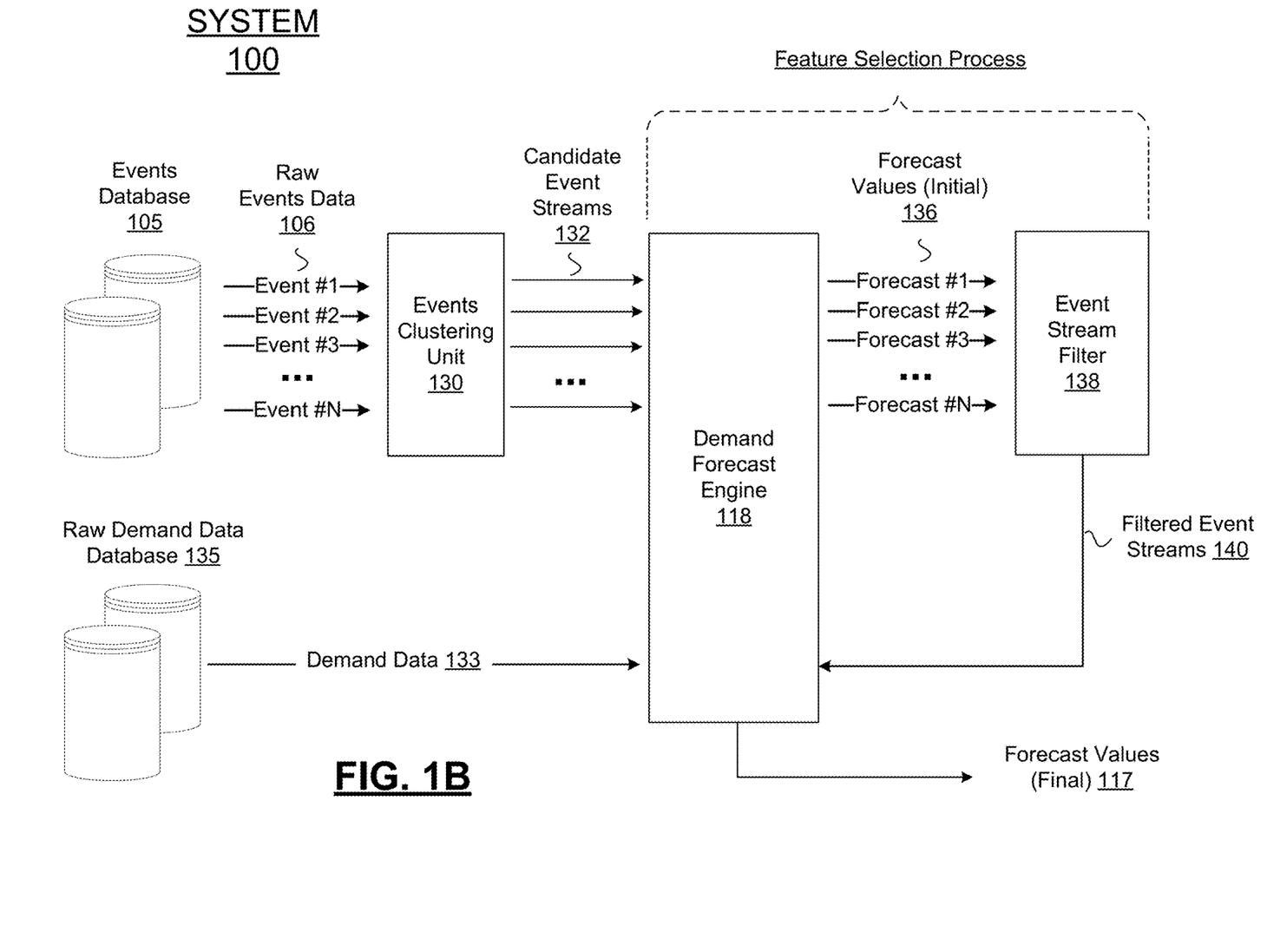
FIG. 1B depicts a conceptual block diagram showing further details of an example embodiment of a machine learning system for demand forecasting that implements an improved process for predicting the impact of events on demand forecasts for an organization using event streams in accordance with the teachings of this disclosure.

FIG. 1B depicts a conceptual block diagram showing further details of an example embodiment of a machine learning system for demand forecasting that implements an improved process for predicting the impact of events on demand forecasts for an organization using event streams in accordance with the teachings of this disclosure. In the illustrated embodiment the raw events data 105 is supplied to an event clustering unit 130. The event clustering unit 130 may be a component of the events processing appliance 115. The event clustering unit 130 may be configured to generate a set of candidate event streams 132 from the raw events data 106. The set of candidate event streams 132 can be determined based on clustering together groups of like events into different combinations of the event attributes.

A feature selection process may then be performed on the candidate event steams 132 to compute an initial demand forecast 136 for each combination to determine which ones of the candidate event streams 132 has an appreciable impact on the demand forecasts for the establishment. The candidate event streams 132 may be clustered in ways that have a similar impact on the demand forecasts because the events in these event streams are clustered on the same category and are within the same range of distances from the establishment. The first concept is how to group the event streams together to derive useful information from them. The plurality of events are clustered on the different ones of the possible combinations of the event attributes. The result of this is a set of different candidate event streams 132 (e.g., 125 different event streams) based on each of the different combinations of the dimensions of event attributes.

As one example, the candidate event streams 132 may be grouped together based on (i) the predefined event category associated with the event (e.g., rush hour, concerts, sport events, etc.), (ii) the distance of the event from the geolocation of the organization, and (iii) the time period of the event. As another example, the candidate event streams may be identified by clustering on (i) the different ones of the predefined categories of events, (ii) the different distance ranges between the geolocation of the event and the establishment, and (iii) the different ranges of importance numbers associated with the importance of the event (e.g., values 0-20 in one group, 21-40 in another group, and so on), and by the different combinations of these three event attributes. The clustered candidate event streams 132 each have a similar impact on the final demand forecast values 117 output from the demand forecasting engine 118.

But not all of the candidate event steams 132 are relevant to forecasting because not all of them will have an appreciable impact on the output demand forecast values 117. The results obtained from computing the initial demand forecasts 136 for the set of candidate event streams 132 can be filtered to obtain a set of filtered event streams 140 that have an impact on the demand forecasts for the establishment. For this purpose the candidate event streams 132 may be input into the demand forecasting engine 118 to compute an initial (trial) demand forecast 136 for each combination of the event attributes in the raw events data 106. The initial demand forecasts 136 may be conducted using a simple forecasting model (e.g., gradient boosting or other machine learning algorithm) whose goal is not so much to provide the final demand forecast 117 but to determine which of the candidate event streams 132 has an appreciable impact on the forecasts. One or more of multiple machine learning models/algorithms may be utilized to perform the initial demand forecasts 136. For example, there may be 10 of 30 candidate event streams 132 input into the initial demand forecast computations that really made an impact on the output demand forecast values 117, and the other 20 candidate event streams 132 that did not.

The machine learning algorithms (not shown) may include a plurality of different options for use with the techniques described herein. Some machine learning models/algorithms make it easier to look back and see which inputs 132 affected the output values 136 and by what magnitude. The relative weight of each of these inputs 132 on the output initial demand forecast values 136 may be determined from the algorithm(s). For instance, some machine learning algorithms, such as decision trees, are configured such that the tree can be followed back to see which inputs 132 really affected the output values 136. There are other ways as well—for instance the inputs to the particular demand forecasting algorithm can be toggled while observing the output values. If there are no events within the specified distance from the establishment, then the initial forecast values 136 may be either high or low based on that. The same thing goes if there is an event within the specified distance. It can be observed whether the output values 136 went up or down in response to the input values 132 and by what magnitude the output values 136 were changed by looking at the pattern of 1s and 0s on the input of the machine learning algorithm(s) and observing the corresponding change in values at the output.

In aspects, the candidate event streams 132 may be filtered based on evaluating the initial forecast values 136 for each of the streams. As shown in FIG. 1B, initial demand forecasts 136 are input into an event stream filter 138. The event stream filter 138 may also be a component of the event processing appliance 115. The filtering of the clustered candidate event streams 132 may include selecting groups of event streams that had an appreciable impact (or a significant impact) on the initial demand forecast values 136 output from the demand forecasting engine 118.

In one aspect, the determination of which of the candidate event streams 132 has an appreciable impact on the initial demand forecast values 136 output from the demand forecasting engine 118 can be based on evaluating the magnitude of the impact it had on the initial demand forecast 136 computed for the candidate event streams 132 during the feature selection process. A predefined threshold value (not shown) for the magnitude of the impact each candidate event streams 132 had on the computed output values 136 from the initial demand forecasts can be preset in system 100. The subset of candidate event streams 132 that correspond with an initial demand forecast 136 with a magnitude greater than the predefined threshold value may be determined to have an appreciable or significant impact on the output values 136 and may thus be identified for inclusion into the filtered set of event streams 140 for use in future demand forecasts for the products and/or services provided by the establishment. The filtered set of event streams 140 can thereafter be used as additional data points along with the demand data 133 input into the demand forecasting engine 118 for improved accuracy in computing future demand forecasts for the particular products and/or services, particularly for time periods wherein there is a nearby event planned.

In at least certain embodiments the events data may be communicated to the database server 102 and stored in the events database 105 as time-based events. Because the events database 105 is configured as a time series database, the machine learning system 100 may be adapted to identify patterns in the events data stored in the events database over time to learn which of the candidate events has an appreciable or significant impact on the demand forecast for the establishment. Time-shifted demand forecasts values may also be obtained by computing demand forecasts for the establishment based on filtered sets of event streams 140 at times before, during and after the time periods of the events.

In such cases, the events data 106 may be associated with a timestamp and may comprise time series data. As used herein the term "time series" refers to a series of data points indexed (or listed or graphed) in time order. Time series applications rely on a form of data that measures how things change over time, where time is not just a metric but a primary axis. Time series data may be thought of a sequence of data points measuring the same quantity over time and stored with a timestamp in temporal order. It may also be thought of as a series of numeric values, each paired with a timestamp, defined by a name and a set of labeled dimensions (or "tags"). Time series are used in statistics, signal processing, pattern recognition, and just about any domain of applied science or engineering which involves conducting temporal measurements or storing data with temporal ordering.

In one embodiment the events database 105 may be configured as time series database ("TSDB") and the events data 106 may be stored therein ordered as a series of timestamped events. A TSDB may be implemented in a system or platform optimized for handling time series data, or arrays of numbers indexed by time (a date/time or a date/time range). A TSDB allows users to create, enumerate, update and/or destroy various time series data and organize it as a series of sequential events in time. The TSDB can also filter on arbitrary patterns such as time ranges, low value filters, high value filters, or even have the values of one series filter another series. Time series data typically arrives in sequential time order. Newly arriving time series data may be recorded as a new entry in the TSDB. Time-series data workloads are generally configured as "append-only", thus inherently organizing each data stream by its time at write into storage. The current state of the TSDB can be tracked over time by writing new events data in a separate row. Time series datasets can therefore track changes to the overall system such that new write data is added to the top of the stack. By preserving the inherent time series nature of the data, valuable information on how that data changes over time can be preserved and used for various data analytics.

In one embodiment the importance values for the events may also be divided up into ranges of importance values and used as an additional dimension in the grouping of events to obtain the set of candidate event streams. As used herein an "importance number" or "importance value" may be a value assigned to an event to represent its relative impact on the demand forecast for the particular products and/or services of the establishment. The importance value may be based on a myriad of information harvested from a variety of data sources 112 over the computer network 110, including online sources and social media sentiment, etc. For example, the relative importance of events may be reflected in online conversations over social media channels. This information may be converted into a relative importance score for the event (as compared to other events in the vicinity of the establishment) and input as an additional events attribute associated with the event which can be used as an additional dimension for clustering on the different combinations of event attributes.

The specified farthest distance from the establishment may be determined based on the farthest distance in which there to be an appreciable impact from traffic patterns surrounding the geographic area of the establishment. An input specifying the farthest distance from the geolocation of the organization may be received from user input or determined based on historical demand forecast values.

It should be noted that the historical demand data supplied to the system 100 from the one or more different data sources 112 may comprise transaction data. As used herein the term "demand data" includes transaction data of any data type. In at least certain aspects the demand data may be obtained from transaction data stored in one or more databases of online payment processors (such as Square, Inc. and Revel Systems, Inc., etc.) which are configured to perform online payment processing and settlement operations for one or more transactions, and to store the data generated from transactions into one or more databases accessible via one or more secure computer networks. Such demand data may include, for example, a description of the item or service sold, purchase price, and date of transaction, etc. The transaction data from previous occasions can be used as an indicator/predictor of what the demand for a particular item, product or service will be on a future occasion. It should also be noted, however, that the teachings of this disclosure are not limited to online payment processors as certain embodiments may also be used with conventional payment processing networks such as those proprietary networks of Visa and MasterCard, which are also adapted to store transaction data in one or more databases that can be accessed over one or more secure financial networks.

In addition, the described embodiments are not intended to be limited to any particular demand data as any number of different types of data may be used to forecast demand for the goods, products, and/or services based on any number of user-configurable factors. Rapid developments in computer resources have provided businesses in the service industry with the potential to collect and maintain vast historical databases of transaction history. Conventional applications called Enterprise Resource Planning ("ERP") applications have been developed over the years to generate such data. Examples of such conventional ERP packages include SAP, Baan, and PeopleSoft, among many others. Volumes of historical transaction data may therefore be available to those businesses that have archived data produced by various ERP applications. Transaction data that relates to purchase orders, service requests, and other activities is potentially available.

In addition, other data and/or data types, may be relevant as input(s) to the demand forecasting system 100. The described embodiments are not intended to be limited to transaction data as any number of different types of data may be used to forecast demand for the products and/or services based on any number of user-configurable factors. For example, retail store traffic data and duration of the traffic (such as can be obtained from traffic counter systems like RetailNext®) may also be used as input(s) to the demand forecasting system. System 100 may also be configured to process human resources data. Examples of such human resources data may include employee information (e.g., department, division, location, manager, etc.), change in job information (e.g., title, compensation grade, etc.), personal information (e.g., name, location, contact information, etc.), vacation, sick days, leaves of absence, short-term disability, long-term disability, suspensions, furloughs, termination, performance rating, training completion, career plans, etc.

In aspects, the event steams are streams of numbers (e.g., this is a stream of events between 50 and 100 meters from the establishment, of category "large concert", where the importance score is within a range of importance scores from 60 to 80). For instance an event stream may include information indicating that at 9 am in the morning there are no events within the specified distance, at 10 am there are no events, but at 11 am there is one event of category sporting event, and so on. The machine learning algorithm(s) can be adapted to learn that when there is an event, the number of cups of coffee sold at a particular coffee house increases by some amount. So when forecasting for future occasions, those same event streams can be used to determine if there are any events for the forecast period and take those events into account. Those event streams can be used to see how they affect the output demand forecast.

Figure 3:
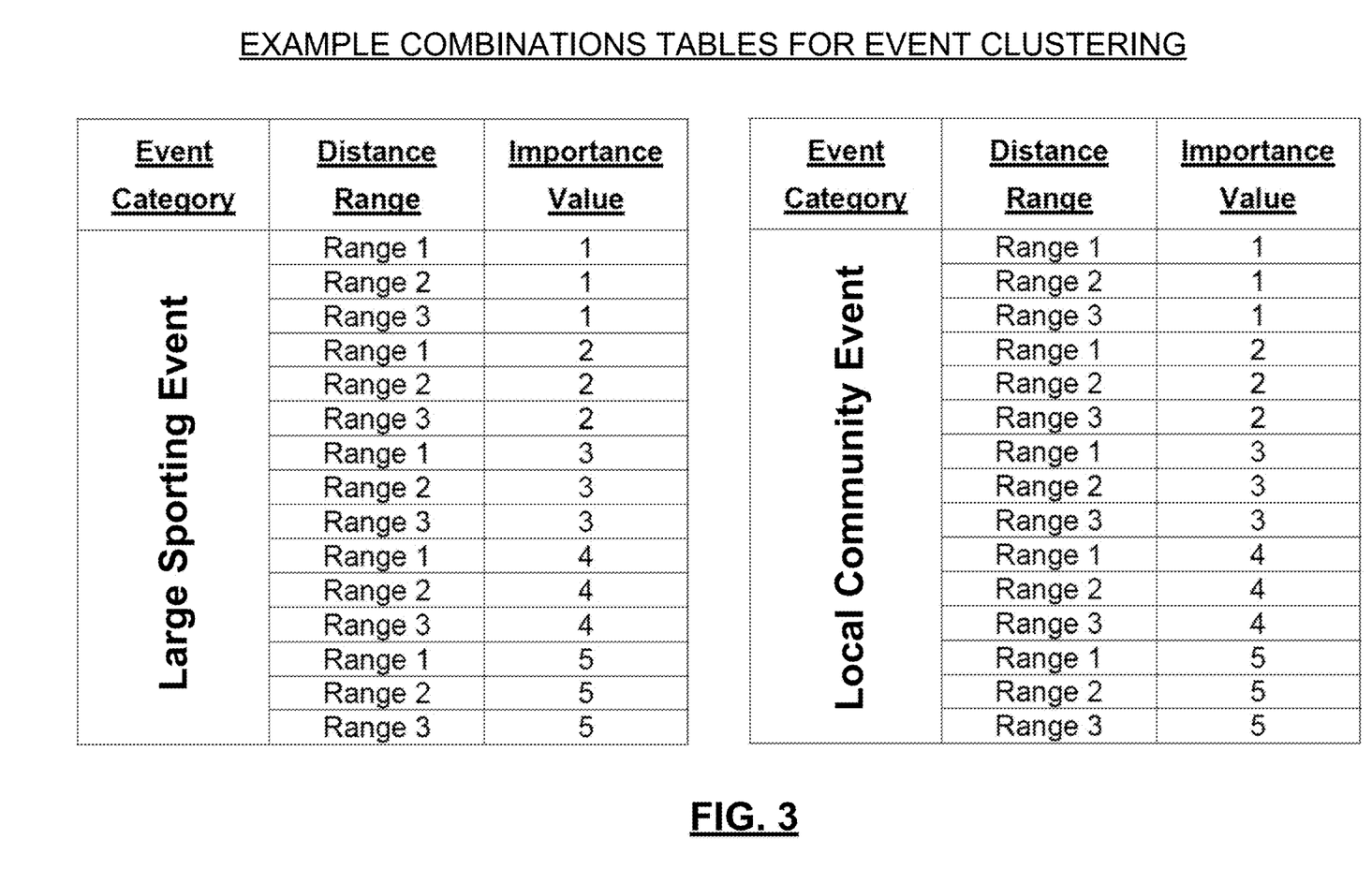
FIG. 3 depicts example embodiments of combinations tables event clustering in accordance with the techniques described in this disclosure.
Figure 4:
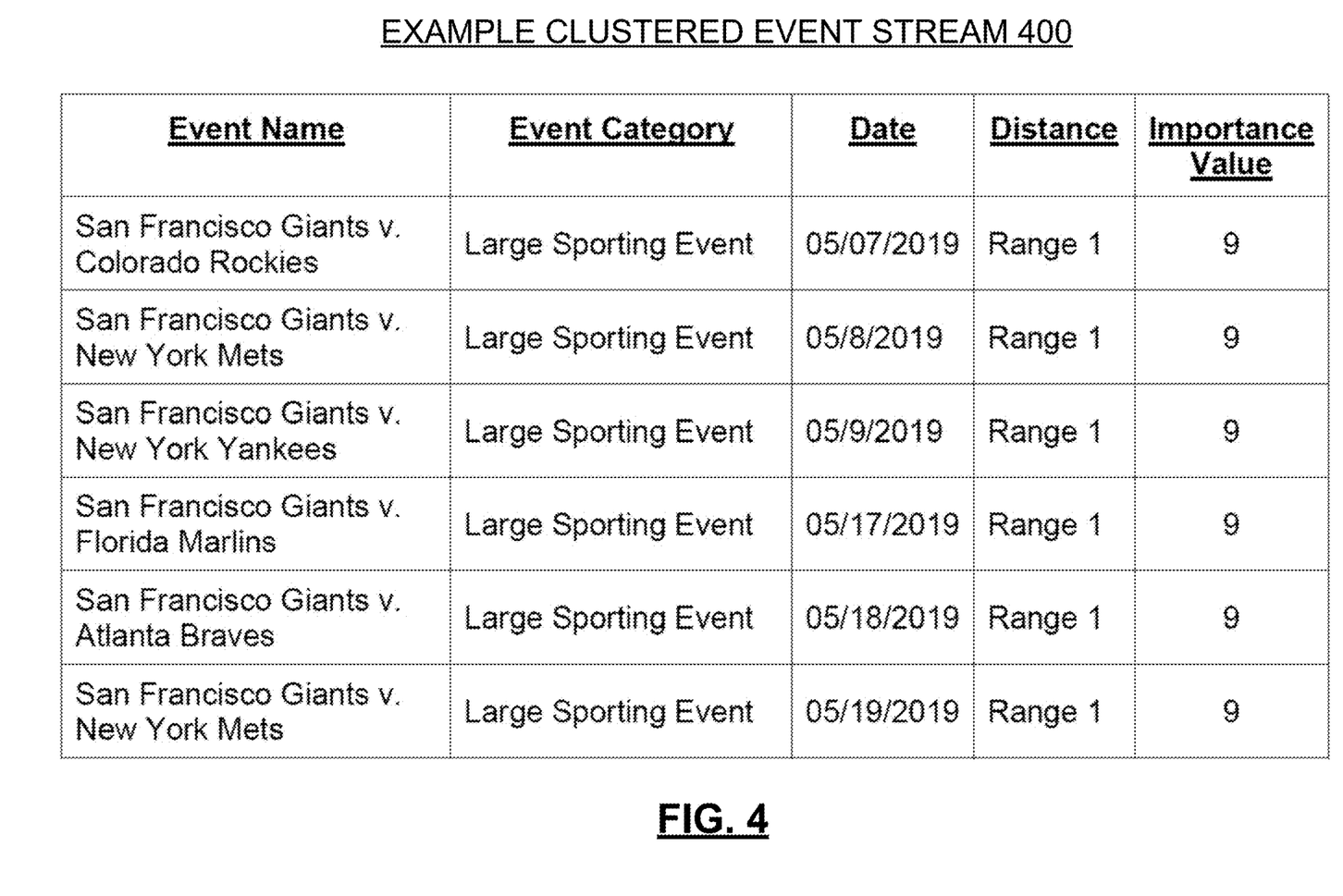
FIGS. 4-5 depict example embodiments of clustered event streams in accordance with the techniques described in this disclosure.
Figure 5:
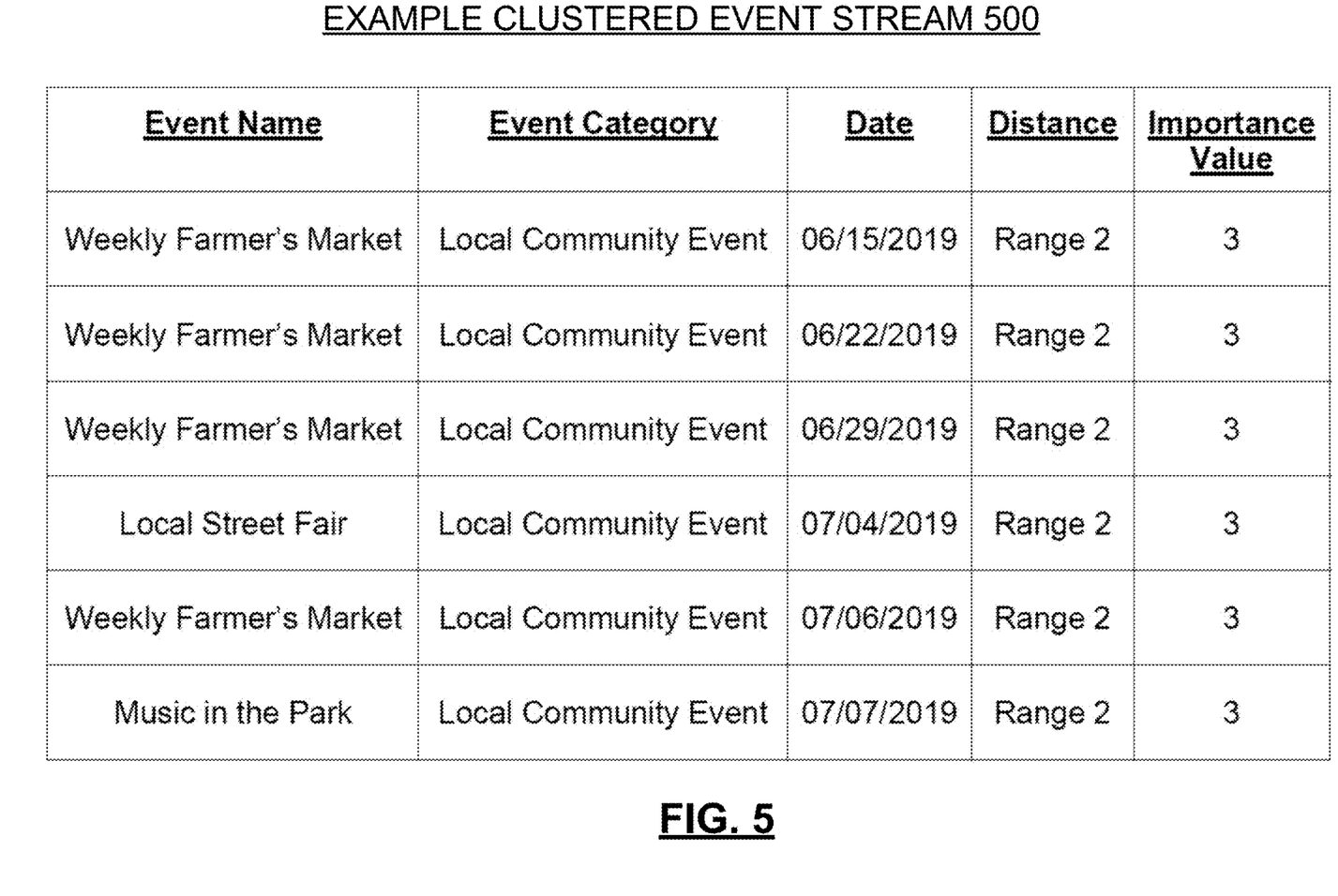

FIG. 3 depicts example embodiments of combinations tables event clustering in accordance with the techniques described in this disclosure. As shown, for the event categories "Large Sporting Event" and "Local Community Event", every different combination of range of distances from the establishment (Range 1, Range 2 or Range 3) and every different combination of importance value (1-5) may be utilized in generating the set of candidate event streams 132. FIGS. 4-5 depict a few example embodiments of clustered event streams in accordance with the techniques described in this disclosure. Note that each clustered event stream 400 and 500 include different events on different dates, but with the same event category, distance range and importance value.

Example Processes

The following figures depict flow charts illustrating various example embodiments of a process for implementing an improved process for predicting the impact of events on demand forecasts for an organization using event streams in accordance with the techniques described in this disclosure. It is noted that the processes described below are exemplary in nature and are provided for illustrative purposes, and not intended to limit the scope of this disclosure to any particular example embodiment. For instance, processes in accordance with some embodiments described in this disclosure may include or omit some or all of the operations described below or may include operations in a different order than described. The particular processes described are not intended to be limited to any particular set of operations exclusive of all other potentially intermediate operations. In addition, the operations may be embodied in computer-executable code, which may cause a general-purpose or special-purpose computer processor to perform operations for providing date alignment for demand forecasts. In other instances, these operations may be performed by specific hardware components or hardwired circuitry, or by any combination of programmed computer components and custom hardware circuitry.

Figure 6A:
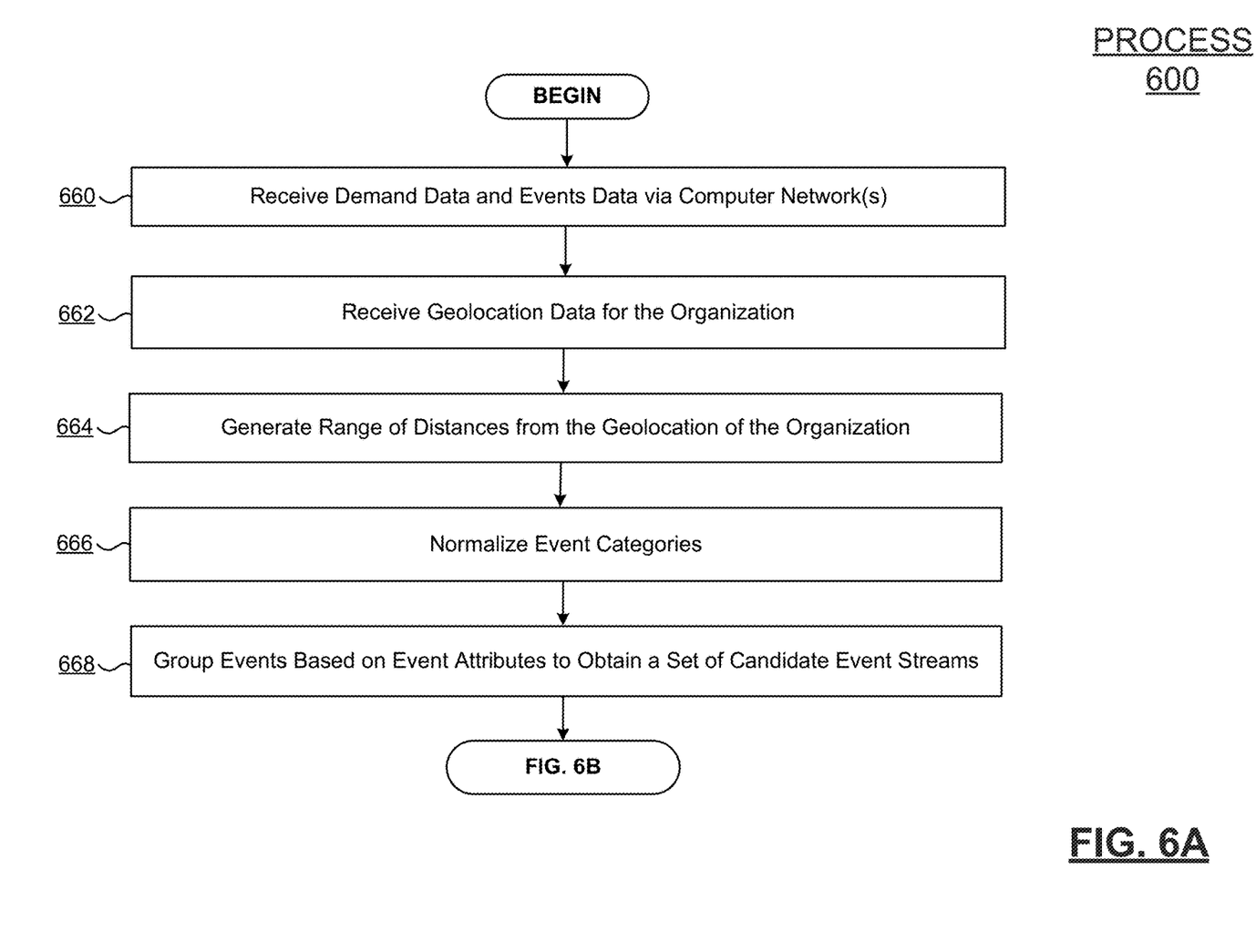
FIGS. 6A-6B depict a flow chart of an example embodiment of a process for implementing an improved process for predicting the impact of events on demand forecasts for an organization using event streams in accordance with the techniques described in this disclosure.
Figure 6B:
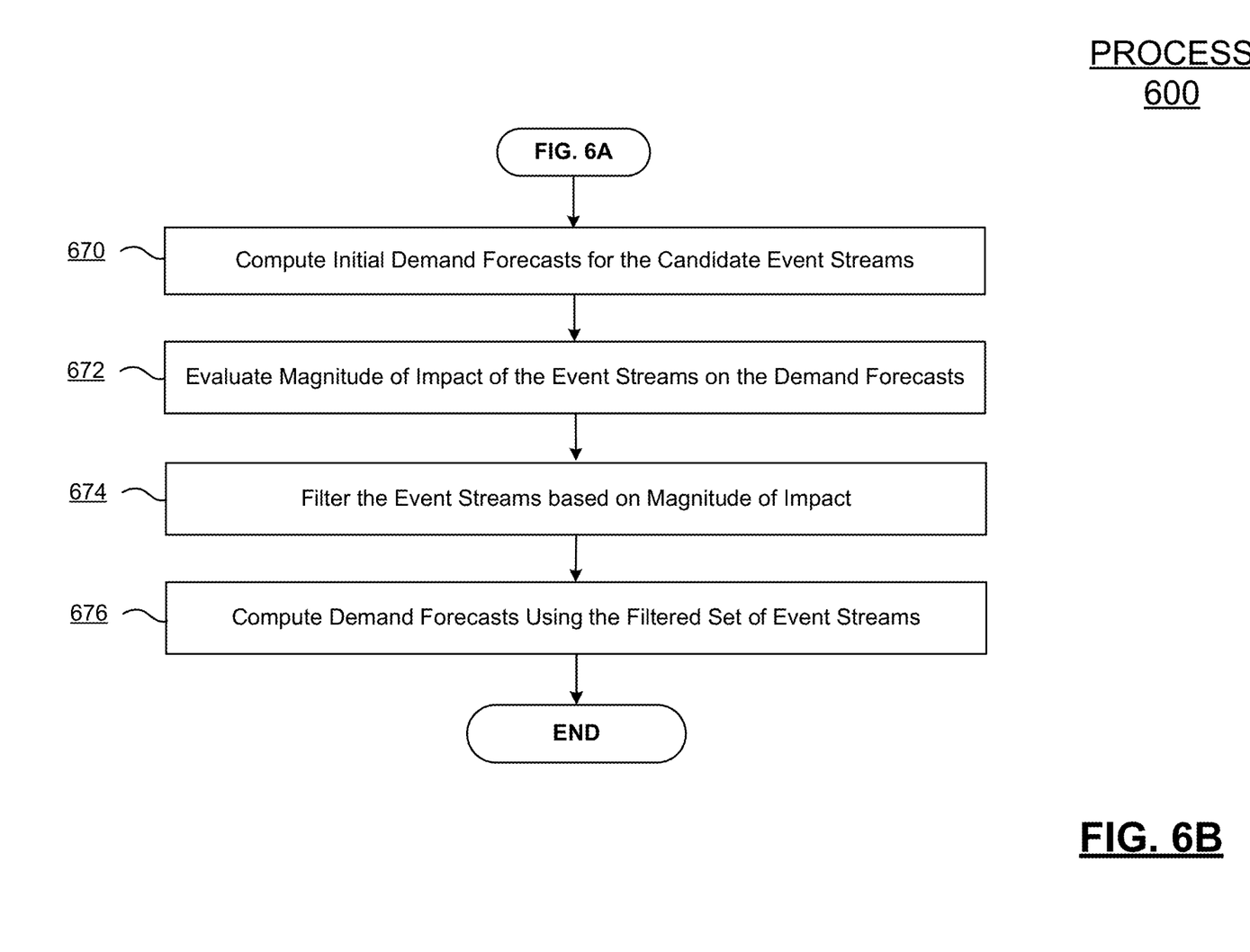

FIGS. 6A-6B depict a flow chart of an example embodiment of a process for implementing an improved process for predicting the impact of events on demand forecasts for an organization using event streams in accordance with the techniques described in this disclosure. At least certain embodiments of the process may be implemented in a machine learning system for demand forecasting at a computer hardware server comprising a processor, system memory and a network interface for communications over one or more computer networks. The machine learning system may to one or more databases adapted for storing data routed over the one or more computer networks from one or more data sources.

In the illustrated embodiment, process 600 begins at operation 660 by receiving, via the computer networks, demand data for products or services of the organization from a database of demand data and events data comprising event attributes from a database of events data for a plurality of different events located within a distance from the geolocation of the organization. Process 600 continues by receiving geolocation data identifying the geolocation of the organization (operation 662) and generating a range of distances based on segmenting the distance from the geolocation of the organization into a plurality of different distances (operation 664). Event categories for each of the plurality of different events may then be normalized by assigning them to one of a set of predefined event categories at operation 666. The events may then be grouped into different combinations of the events based on event attributes at operation 668. In one embodiment, events in a same predefined event category and within a same range of distances from the geolocation of the organization are grouped together.

Process 600 continues to FIG. 6B wherein a set of candidate event streams may be generated from the plurality of different events based on executing a feature selection process on them. The feature selection process may include computing an initial set of demand forecast values for each of the set of candidate event streams using one or more machine learning algorithms (operation 670), evaluating the magnitude of impact each of the candidate event streams has on the computed initial set of demand forecast values to determine which candidate event streams have an impact on the computed demand forecast values (operation 672), and filtering the resulting candidate event streams to obtain a filtered set of event streams comprising ones of the candidate event streams determined to have an impact on the computed initial set of demand forecast values (operation 674). The filtered event streams may then be used along with the demand data as inputs to the demand forecasting analysis for computing one or more forecasts for demand of products or services provided by the organization (operation 676).

The machine learning system may be adapted to identify patterns in the events data stored in the events database over time. The demand forecasts for the organization may be based on the filtered set of event streams at times before or after the time period for each event to obtain time-shifted demand forecasts values. The event attributes may further include the size of the event, event location or venue, and an importance value associated with the event indicating its relative impact on the demand forecasting for the organization.

In at least certain embodiments, importance values for the plurality of events may be divided into a plurality of ranges of importance values which may be used as an additional event attribute for the grouping of the plurality of events to obtain the set of candidate event streams. In embodiments, the initial demand forecast may be executed on the set of candidate event streams using an algorithm selected from one or more machine learning algorithms adapted for computing demand forecast values. This completes process 600 according to one example embodiment.

Example Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

A hardware module may be implemented mechanically, electronically, or any suitable combination thereof. A hardware module may include dedicated circuitry or logic that is permanently configured to perform certain operations. For example, a hardware module may be a special-purpose processor, such as a Field Programmable Gate Array ("FPGA") or an Application Specific Integrated Circuit ("ASIC"), Programmable Logic Device ("PLD"), etc.

A hardware module may also include programmable logic or circuitry that is temporarily configured by software to perform operations. For example, a hardware module may include software executed by a general-purpose processor or other programmable processor. Once configured by such software, hardware modules may become specific machines (or specific components of a machine) tailored to perform one or more configured functions. It will be appreciated that the decision to implement a hardware module mechanically in dedicated and permanently configured circuitry, or in temporarily configured circuitry (e.g., configured by software) may be driven by cost and time considerations. Accordingly, the phrase "hardware module" should be understood to encompass a tangible organization, be that an organization that is physically constructed, permanently configured (e.g., hardwired), or temporarily configured (e.g., programmed) to operate in a certain manner or to perform certain of the operations described in this disclosure.

Similarly, the functions described in this disclosure may be at least partially processor-implemented, with a particular processor or processors being an example of hardware. For example, at least some of the operations of a function may be performed by one or more processors or processor-implemented modules. Moreover, the one or more processors may also operate to support performance of the relevant operations in a cloud computing environment or as software as a service ("SaaS"). In addition, at least some of the operations may be performed by a group of computers (as examples of machines including processors), with these operations being accessible via a network (e.g., the Internet) and via one or more appropriate interfaces (e.g., an API).

Figure 7:
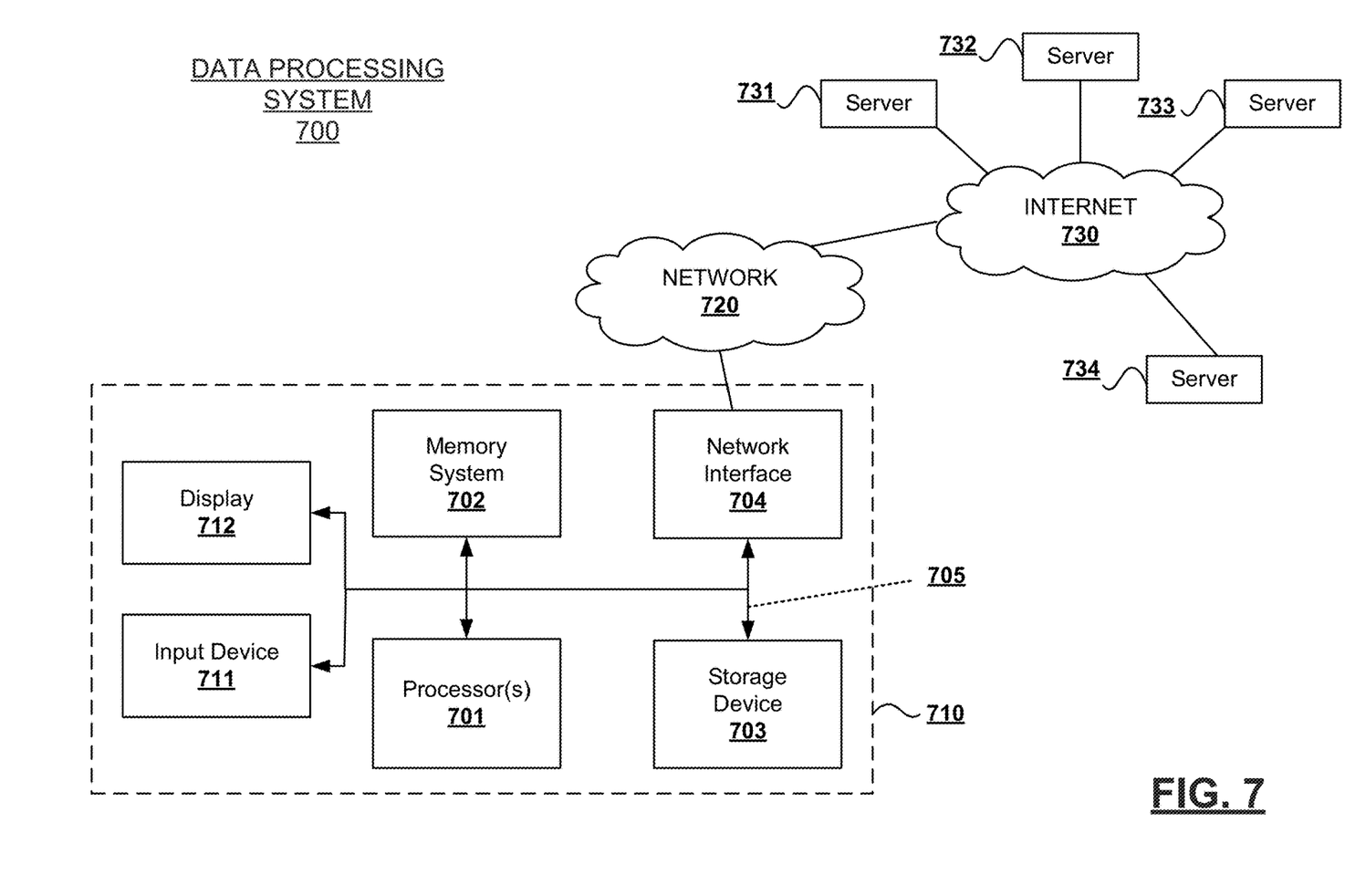
FIG. 7 depicts an overview block diagram of an example data processing system upon which the embodiments described in this disclosure may be implemented.

FIG. 7 depicts an overview block diagram of an example data processing system upon which the embodiments described in this disclosure may be implemented. It is to be understood that a variety of computers configurations may be used to implement the described techniques. While FIG. 7 illustrates various components of a data processing system 700, it is not intended to represent any particular architecture or manner of interconnecting components. It will also be appreciated that network computers and other data processing systems, which have fewer components or additional components, may be used. The data processing system 700 may, for example, comprise a personal computer (PC), workstation, laptop computer, tablet, smartphone or handheld wireless device, or any device having similar functionality.

In the illustrated embodiment, data processing system 700 includes a computer system 710. Computer system 710 includes an interconnect bus 705 (or other communication mechanism for communicating information) and one or more processor(s) 701 coupled with the interconnect bus 705 for processing information. Computer system 710 also includes a memory system 702 coupled with the one or more processors 701 via the interconnect bus 705. Memory system 702 is configured to store information and instructions to be executed by processor 701, including information and instructions for performing the techniques described above. This memory system may also be used for storing programs executed by processor(s) 701. Possible implementations of this memory system may be, but are not limited to, random access memory (RAM), read only memory (ROM), or combination thereof.

In the illustrated embodiment, a storage device 703 is also provided for storing information and instructions. Typically storage device 703 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 703 may store source code, binary code, or software files for performing the techniques above. In addition, while FIG. 7 shows that storage device 703 as a local device connected with the components of the data processing system, it will be appreciated by skilled artisans that the described techniques may use a storage device remote from the system, such as a database or other network storage device coupled with the computer system 710 through a network interface such as network interface 704.

Network interface 704 may provide communications between computer system 710 and a network 720. The network interface 704 may be a wireless or wired connection, or any combination thereof. Computer system 710 is configured to send and receive information through the network interface 704 across one or more networks 720 such as a local area network (LAN), wide-area network (WAN), wireless or Bluetooth network, or the Internet 730, etc. Computer system 710 may access data and features on systems residing on one or multiple different hardware servers 731-734 across the network 720. Hardware servers 731-734 and associated server software may also reside in a cloud-computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion. Storage device 703 and memory system 702 are both examples of non-transitory computer readable storage media.

Further, computer system 710 may be coupled via interconnect bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized interconnect buses.

With these embodiments in mind, it will be apparent from this description that aspects of the described techniques may be embodied, at least in part, in software, hardware, firmware, or any combination thereof. The techniques may be carried out in a computer system or other data processing system in response executing sequences of instructions stored in memory.

This disclosure has been described in terms of the representative embodiments disclosed herein. The above example embodiments should not be deemed to be the only embodiments and are presented to illustrate the flexibility and advantages of the described techniques. Other embodiments, implementations, and/or equivalents will be evident to those skilled in the art and may be employed without departing from the spirit and scope of this disclosure as defined by the following claims.

What is claimed is:

1. A method comprising:
at a machine learning system for demand forecasting configured to perform operations for predicting the impact of a plurality of events on demand forecasts for an organization using event streams, the machine learning system implemented in a computer hardware server comprising a processor, system memory and a network interface for communications over one or more computer networks, the machine learning system having access to one or more databases adapted for storing data routed over the one or more computer networks from one or more data sources, the operations comprising:
receiving, via the computer networks, demand data for products or services of the organization from a database of demand data and events data comprising event attributes from a database of events data for a plurality of different events located within a distance from the geolocation of the organization;
performing a feature selection process for selecting, from among a set of features that are available for use in training or updating a final machine learning model to compute one or more forecasts for demand of products or services provided by an organization, a subset of the features to use for training the final machine learning model, comprising:
receiving geolocation data identifying the geolocation of the organization;
generating a range of distances based on segmenting the distance from the geolocation of the organization into a plurality of different distances;
normalizing event categories for each of the plurality of different events by assigning them to one of a set of predefined event categories;
grouping the events into different combinations of the events based on event attributes, wherein events in a same predefined event category and within a same range of distances from the geolocation of the organization are grouped together; and
generating a set of candidate event streams from the plurality of different events based on executing a feature selection process comprising:
(i) computing, for each of the set of candidate event streams, an impact that the candidate event stream has on an initial set of demand forecast values using a trial machine learning model that is trained to compute, for an input candidate event stream, the impact that the input candidate event stream has on the initial set of demand forecast values;

(ii) evaluating a magnitude of the impacts of each of the candidate event streams on the computed initial set of demand forecast values that were computed using the trial machine learning model to determine which candidate event streams have an impact on the computed demand forecast values; and (iii) filtering the candidate event streams to obtain a filtered set of event streams comprising ones of the candidate event streams determined to have an impact on the computed initial set of demand forecast values; and using the filtered set of event streams and the demand data as training data to train or update the final machine learning model to compute the one or more forecasts for demand of products or services provided by the organization.

2. The method of claim 1 wherein the machine learning system is adapted to identify patterns in the events data stored in the events database over time.

3. The method of claim 1 further comprising computing demand forecasts for the organization based on the filtered set of event streams at times before or after the time period for each event to obtain time-shifted demand forecasts values.

4. The method of claim 1 wherein the event attributes further include the size of the event, event location or venue, and an importance value associated with the event indicating its relative impact on the demand forecasting for the organization.

5. The method of claim 4 wherein the operations further comprise dividing the importance values for the plurality of events into a plurality of ranges of importance values and using the ranges of importance values as an additional event attribute for the grouping of the plurality of events to obtain the set of candidate event streams.

6. A system comprising:
a computer hardware server comprising a processor, system memory and a network interface for communicating via one or more computer networks, the computer hardware server implementing a machine learning system having access to one or more databases adapted for storing data routed over the one or more computer networks from one or more data sources, the machine learning system configured to perform operations for predicting the impact of a plurality of events on a demand forecast for an organization using event streams, the operations comprising:
receiving, via the computer networks, demand data for products or services of the organization from a database of demand data and events data comprising event attributes from a database of events data for a plurality of different events located within a distance from the geolocation of the organization;
performing a feature selection process for selecting, from among a set of features that are available for use in training or updating a final machine learning model to compute one or more forecasts for demand of products or services provided by an organization, a subset of the features to use for training the final machine learning model, comprising:
receiving geolocation data identifying the geolocation of the organization;
generating a range of distances based on segmenting the distance from the geolocation of the organization into a plurality of different distances;
normalizing event categories for each of the plurality of different events by assigning them to one of a set of predefined event categories;
grouping the events into different combinations of the events based on event attributes, wherein events in a same predefined event category and within a same range of distances from the geolocation of the organization are grouped together; and
generating a set of candidate event streams from the plurality of different events based on executing a feature selection process comprising:
(i) computing, for each of the set of candidate event streams, an impact that the candidate event stream has on an initial set of demand forecast values using a trial machine learning model that is trained to compute, for an input candidate event stream, the impact that the input candidate event stream has on the initial set of demand forecast values;

(ii) evaluating a magnitude of the impacts of each of the candidate event streams on the computed initial set of demand forecast values that were computed using the trial machine learning model to determine which candidate event streams have an impact on the computed demand forecast values; and (iii) filtering the candidate event streams to obtain a filtered set of event streams comprising ones of the candidate event streams determined to have an impact on the computed initial set of demand forecast values; and using the filtered set of event streams and the demand data as training data to train or update the final machine learning model to compute the one or more forecasts for demand of products or services provided by the organization.

7. The system of claim 6 wherein the machine learning system is adapted to identify patterns in the events data stored in the events database over time.

8. The system of claim 6 further comprising computing demand forecasts for the organization based on the filtered set of event streams at times before or after the time period for each event to obtain time-shifted demand forecasts values.

9. The system of claim 6 wherein the event attributes further include the size of the event, event location or venue, and an importance value associated with the event indicating its relative impact on the demand forecasting for the organization.

10. The system of claim 9 wherein the operations further comprise dividing the importance values for the plurality of events into a plurality of ranges of importance values and using the ranges of importance values as an additional event attribute for the grouping of the plurality of events to obtain the set of candidate event streams.

11. A non-transitory computer readable storage medium adapted for storing programmed computer code executable by a computer hardware server for implementing a machine learning system for performing operations for predicting the impact of a plurality of events on a demand forecast for an organization using event streams, the operations comprising:
receiving, via the computer networks, demand data for products or services of the organization from a database of demand data and events data comprising event attributes from a database of events data for a plurality of different events located within a distance from the geolocation of the organization;
performing a feature selection process for selecting, from among a set of features that are available for use in training or updating a final machine learning model to compute one or more forecasts for demand of products or services provided by an organization, a subset of the features to use for training the final machine learning model, comprising:

receiving geolocation data identifying the geolocation of the organization;

generating a range of distances based on segmenting the distance from the geolocation of the organization into a plurality of different distances;

normalizing event categories for each of the plurality of different events by assigning them to one of a set of predefined event categories;

grouping the events into different combinations of the events based on event attributes, wherein events in a same predefined event category and within a same range of distances from the geolocation of the organization are grouped together;

generating a set of candidate event streams from the plurality of different events based on executing a feature selection process comprising:

(i) computing, for each of the set of candidate event streams, an impact that the candidate event stream has on an initial set of demand forecast values using a trial machine learning model that is trained to compute, for an input candidate event stream, the impact that the input candidate event stream has on the initial set of demand forecast values;

(ii) evaluating a magnitude of the impacts of each of the candidate event streams on the computed initial set of demand forecast values that were computed using the trial machine learning model to determine which candidate event streams have an impact on the computed demand forecast values; and (iii) filtering the candidate event streams to obtain a filtered set of event streams comprising ones of the candidate event streams determined to have an impact on the computed initial set of demand forecast values; and using the filtered set of event streams and the demand data as training data to train or update the final machine learning model to compute the one or more forecasts for demand of products or services provided by the organization.

12. The computer readable medium of claim 11 wherein the machine learning system is adapted to identify patterns in the events data stored in the events database over time.

13. The computer readable medium of claim 11 further comprising computing demand forecasts for the organization based on the filtered set of event streams at times before or after the time period for each event to obtain time-shifted demand forecasts values.

14. The computer readable medium of claim 11 wherein the event attributes further include the size of the event, event location or venue, and an importance value associated with the event indicating its relative impact on the demand forecasting for the organization.

15. The computer readable medium of claim 14 wherein the operations further comprise dividing the importance values for the plurality of events into a plurality of ranges of importance values and using the ranges of importance values as an additional event attribute for the grouping of the plurality of events to obtain the set of candidate event streams.

* * * * *